(12) United States Patent
Chapman et al.

(10) Patent No.: US 8,869,136 B2
(45) Date of Patent: Oct. 21, 2014

(54) CALCULATING MIGRATION POINTS FOR APPLICATION MIGRATION

(75) Inventors: George S. Chapman, Austin, TX (US); Joseph Foti, Jr., New Windsor, NY (US); James J. Gallombardo, Bridgewater, NJ (US); Kevin D. Galloway, Austin, TX (US); Anthony Manno, III, Hillsborough, NJ (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 12/984,649

(22) Filed: Jan. 5, 2011

(65) Prior Publication Data

US 2012/0174056 A1 Jul. 5, 2012

(51) Int. Cl.
*G06F 9/445* (2006.01)
*G06F 9/44* (2006.01)

(52) U.S. Cl.
CPC ... *G06F 8/77* (2013.01); *G06F 8/76* (2013.01)
USPC .......................................................... 717/174

(58) Field of Classification Search
CPC ................ G06F 8/60; G06F 8/76; G06F 8/77
USPC .......................................... 717/100, 174–178
See application file for complete search history.

(56) References Cited

U.S. PATENT DOCUMENTS

| | | | |
|---|---|---|---|
| 6,269,382 B1 * | 7/2001 | Cabrera et al. ......................... 1/1 |
| 6,895,382 B1 * | 5/2005 | Srinivasan et al. ........... 705/7.17 |
| 7,117,486 B2 | 10/2006 | Wong et al. |
| 7,313,560 B2 | 12/2007 | Dilley, Jr. et al. |
| 7,406,424 B2 * | 7/2008 | Cheeniyil et al. ............. 705/301 |
| 7,587,436 B2 * | 9/2009 | Agetsuma et al. ..................... 1/1 |
| 7,660,867 B2 | 2/2010 | Sakuta |
| 7,774,772 B2 | 8/2010 | Tal et al. |
| 7,913,250 B2 * | 3/2011 | Baron et al. ................... 717/176 |
| 8,332,461 B2 * | 12/2012 | Shin et al. ...................... 709/201 |
| 2003/0078957 A1 * | 4/2003 | Cheeniyil et al. ............. 709/201 |
| 2003/0192028 A1 * | 10/2003 | Gusler et al. .................. 717/101 |
| 2005/0165817 A1 | 7/2005 | O'Conor |
| 2006/0129771 A1 | 6/2006 | Dasgupta et al. |
| 2007/0011669 A1 * | 1/2007 | Varma et al. ................... 717/168 |

(Continued)

OTHER PUBLICATIONS

Brodie et al., "DARWIN: On the Incremental Migration of Legacy Information Systems," Mar. 1993, p. 1-56.*
Wu et al., "Coping with Legacy System Migration Complexity," 2005, IEEE.*

(Continued)

*Primary Examiner* — Qing Chen
(74) *Attorney, Agent, or Firm* — William E. Schiesser; Keohane & D'Alessandro, PLLC (57) ABSTRACT

Embodiments of the present invention relate to "migration points" and an associated method and calculation tool. In general, a migration point is a number that represents an evaluation of the size and complexity of performing a migration, port, or refresh of an application from a legacy platform to a new target platform. When migration points are applied to applications across a portfolio, the migration points provide a relative measurement of the size and complexity necessary to perform the migration. Additionally, this measurement can be used to make a determination in calculating migration productivity (i.e., migration points divided by person-months, similar to how software productivity utilizes function points). In a typical embodiment, the migration point total is based on a set of qualitative migration points and a set of quantitative migration points, which are based on various technical aspects of the application, operating system, and hardware involved with the migration process.

18 Claims, 9 Drawing Sheets

(56) References Cited

U.S. PATENT DOCUMENTS

| | | | |
|---|---|---|---|
| 2007/0113226 A1* | 5/2007 | Baron et al. | 717/176 |
| 2007/0239655 A1* | 10/2007 | Agetsuma et al. | 707/1 |
| 2007/0240143 A1 | 10/2007 | Guminy et al. | |
| 2009/0132804 A1 | 5/2009 | Paul et al. | |
| 2011/0173633 A1* | 7/2011 | Shin et al. | 718/108 |

OTHER PUBLICATIONS

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

* cited by examiner

FIG. 1

| Migration Point Counting Model | 44 | MP Assessment Date: | XX/XX/XXXX | Migration Points: | 10,422 | 46 | | | 48 | |
|---|---|---|---|---|---|---|---|---|---|---|
| | | Date of Last Full Build: | XX/XX/XXXX | # of system interfaces: | 41 | | | Quantitative Data | | 9570.04 |
| Application Name: | LINE XYZ System | Prod Releases since Last Full Build: | 2 | # of servers: | 19 | # COTS to be replaced: | 3 | Operating System Migration Points | | 52.44 |
| Source OS: | PA-RISC UX 11.0 | Can code be frozen during migration? | No | Total # of COTS: | 3 | | | Code Migration Points | | 5911.39 |
| Target OS: | AIX 6.1 | Years since last full tech refresh: | 4.7 | # Middleware products: | 8 | # MW products to be replaced: | 8 | Database Migration Points | | 59.37 |
| | | | | | | | | COTS Migration Points | | 709.37 |
| Cross-Platform Migration? | Yes | Current RDBMS Product/Version: | 9.2.0.5 | Hours to regression test: | 560 | | | Middleware Migration Points | | 2837.47 |
| OS Generations back-rev'ed: | 1 | Target RDBMS Product/Version: | 10g | # prod releases last 12 mos: | 4-8 | | | Quantitative Data | | 852.08 |
| | | | | | | | | Last Full Build & Prod Releases/Yr Points | | 250.51 |
| Physical to Virtual conversion? | Yes | Size of DB (GB): | 3,166 | # avail app dev SMEs: | > 4 | | | Code Sync Points | | 295.57 |
| | | DB Cross-Vendor Migration? | No | | | | | Testing & Sys Interfaces Points | | 306.00 |
| | | | | | | | | SME Availability Points | | 0.00 |
| | | DB Generations back-rev'ed: | 1 | | | | | | | |

| Application Development Languages | Language Version | Number of Files | Lines of Code | Code gen by Custom Tool? | Use POSIX Threads? | Use Sun Threads? | Use Custom Kernal Routines? | Use Multinational Character Sets? | Use Inter-process Communication? | Use Embedded SQL/ RDBMS? | Use App-level Clustering? | Compute-intensive or I/O-intensive? |
|---|---|---|---|---|---|---|---|---|---|---|---|---|
| 1 C (Compiled) | ANSI C A.11.01.20 | 102 | 14,175 | No | No | No | Yes | No | No | No | No | Compute-intensive |
| 2 C++ (Centerline compiler) (Compiled) | aC++ A.03.25 | 2,231 | 1,182,156 | Yes | Yes | No | Yes | No | Yes | No | No | I/O-intensive |

CONTINUED FROM FIG. 2A ①

| | | | | | | | | | | | | | |
|---|---|---|---|---|---|---|---|---|---|---|---|---|---|
| 3 | Oracle Pro*C /C++ (4GL) | 9.2.0.5.0 | 2,224 | 377,415 | Yes | No | No | No | No | No | No | No | I/O-intensive |
| 4 | Java (Object-oriented) | 1.3 | 305 | 104,225 | Yes | No | No | Yes | No | No | Yes | No | I/O-intensive |
| 5 | XMLmosaic (XML) | 1 | 9 | 1,210 | No | No | No | No | No | No | No | No | |
| 6 | PL/SQL (Procedural) | 8.0.6.0.0 | 5,264 | 515,028 | Yes | No | No | No | No | No | No | No | I/O-intensive |
| 7 | nmake Makefile (Scripting) | 3.1.2 | 705 | 49,737 | No | No | No | No | No | No | No | No | Compute-intensive |
| 8 | AWK (Scripting) | 1 | 5 | 965 | No | No | No | Yes | No | No | No | No | |
| 9 | CORBA IDL (Object-oriented) | Orbix 3.3.9 | 112 | 29,650 | No | No | No | No | No | No | No | No | |
| 10 | Webservice WSDL (XML) | Artix 3.0.2 | 8 | 3,512 | No | No | No | No | No | No | No | No | |
| 11 | Perl (with the perl shell, psh) (Interactive) | 5.6 | 6 | 994 | No | No | No | Yes | No | No | No | No | |
| 12 | LibE / LibOS / G2 (Object-oriented) | 3.1.1. | 11 | 782 | No | No | No | No | No | No | No | No | |
| 13 | GNU Flex (FSF's version of Lex) (Syntax Handling) | 2.4.6 | 2 | 92 | No | No | No | No | No | No | No | No | Compute-intensive |
| 14 | HPUX Message Catalog (Scripting) | B.11.11 | 210 | 10,502 | Yes | No | No | No | Yes | No | No | No | |
| 15 | C (Compiled) | ANSI C A.11.01.20 | 37 | 55,988 | No | No | No | No | No | No | No | No | |

CONTINUED FROM FIG. 2B ①

| | | | | | | | | | | | | | |
|---|---|---|---|---|---|---|---|---|---|---|---|---|---|
| 16 | C++ (Object-oriented) | aC++ A.03.25 | 217 | 525,241 | No | No | No | No | No | No | No | No | |
| 17 | AWK (Scripting) | 1 | | 9 | 943 | No | No | No | No | No | No | No | No |
| 18 | LibE / LibOS / G2 (Object-oriented) | 3.1.1 | | 59 | 10,537 | No | No | No | No | No | No | No | No |
| 19 | nmake Makefile (Scripting) | 3.1.2 | | 52 | 2,261 | No | No | No | No | No | No | No | No | Compute-intensive |
| 20 | Java (Object-oriented) | 1.4.2.1.1 | | 868 | 243,102 | No | Yes | No | No | No | No | Yes | Yes |
| 21 | SQL (Data-oriented) | | | 61 | 4,375 | No | No | No | No | No | No | No | No |
| 22 | XMLmosaic (XML) | | | 160 | 53,427 | No | No | No | No | No | No | No | No |
| 23 | css (Procedural) | | | 1 | 16 | No | No | No | No | No | No | No | No |
| 24 | dtd (Procedural) | | | 45 | 10,093 | No | No | No | No | No | No | No | No |
| 25 | C++ (Compiled) | aC++ A.03.25 | 2,230 | 1,182,156 | No | Yes | No | Yes | No | Yes | No | No | I/O-intensive |
| 26 | | | | | | | | | | | | | |
| 27 | | | | | | | | | | | | | |
| 28 | | | | | | | | | | | | | |
| 29 | | | | | | | | | | | | | |
| 30 | | | | | | | | | | | | | |
| TOT | 25 | | | 14,933 | 4,378,582 | | | | | | | | |
| | | | | | Yes | 5 | 3 | 0 | 6 | 1 | 2 | 2 | 1 |
| | | | | | No | 20 | 22 | 25 | 19 | 24 | No | 23 | 24 |
| | | | Compute-intensive: | | | | | | | | | | 4 |
| | | | I/O-intensive: | | | | | | | | | | 5 |

FIG. 2C

| Language Calculation Section | | | | | | if POSIX |
|---|---|---|---|---|---|---|
| | | Number | Languages Lines of | Comp Mult | LOC/10K* CompMult | Threads add 10% |
| Language | Version | of Files | Code | 1.25 | 1.77 | 1.77 |
| 1  C(Compiled) | HPANSICA.11.01.20 | 102 | 14,175 | 1.99 | 235.25 | 941.00 |
| 2  C++(Centerlinecompiler)(Compiled) | HPaC++A.03.25 | 2,231 | 1,182,156 | 0.38 | 14.34 | 57.36 |
| 3  OracleProˉC/C++(4GL) | 9.2.0.5.0 | 2,224 | 377,415 | 0.85 | 8.86 | 35.44 |
| 4  Java(Object-oriented) | 1.3 | 305 | 104,225 | 0.75 | 0.09 | 0.09 |
| 5  XMLmosaic(XML) | 1 | 9 | 1,210 | 1.00 | 51.50 | 206.00 |
| 6  PL/SQL(Procedural) | 8.0.6.0.0 | 5,264 | 515,028 | 0.75 | 3.73 | 3.73 |
| 7  nmakeMakefile(Scripting) | 3.1.2 | 705 | 49,737 | 1.00 | 0.10 | 0.10 |
| 8  AWK(Scripting) | 1 | 5 | 965 | 0.85 | 2.52 | 2.52 |
| 9  CORBAIDL(Object-oriented) | Orbix3.3.9 | 112 | 29,650 | 0.75 | 0.26 | 0.26 |
| 10  WebserviceWSDL(XML) | Artix3.0.2 | 8 | 3,512 | 1.00 | 0.10 | 0.10 |
| 11  Perl(withtheperlshell,psh)(Interactive) | 5.6 | 6 | 994 | 1.25 | 0.10 | 0.10 |
| 12  LibE/LibOS/G2(Object-oriented) | 3.1.1 | 11 | 782 | 1.00 | 0.01 | 0.01 |
| 13  GNUFlex(FSF'sversionofLex)(SyntaxHandling) | 2.4.6 | 2 | 92 | 1.00 | 1.05 | 4.20 |
| 14  HPUXMessageCatalog(Scripting) | B.11.11 | 210 | 10,502 | 1.25 | 7.00 | 7.00 |
| 15  C(Compiled) | HPANSICA.11.01.20 | 37 | 55,988 | 1.40 | 73.53 | 73.53 |
| 16  C++(Object-oriented) | HPaC++A.03.25 | 217 | 525,241 | 1.00 | 0.09 | 0.09 |
| 17  AWK(Scripting) | 1 | 9 | 943 | 1.25 | 1.32 | 1.32 |
| 18  LibE/LibOS/G2(Object-oriented) | 3.1.1 | 59 | 10,537 | 0.75 | 0.17 | 0.17 |
| 19  nmakeMakefile(Scripting) | 3.1.2 | 52 | 2,261 | 0.85 | 20.66 | 20.66 |
| 20  Java(Object-oriented) | 1.4.2.1.1 | 868 | 243,102 | 1.00 | 0.44 | 0.44 |
| 21  SQL(Data-oriented) | | 61 | 4,375 | 0.75 | 4.01 | 4.01 |
| 22  XMLmosaic(XML) | | 160 | 53,427 | 1.00 | 0.00 | 0.00 |
| 23  css(Procedural) | | 1 | 16 | 1.00 | 1.01 | 1.01 |
| 24  dtd(Procedural) | | 45 | 10,093 | 1.40 | 165.50 | 165.50 |
| 25  C++(Compiled) | HPaC++A.03.25 | 2,230 | 1,182,156 | | | |
| 26 | | | | | | |
| 27 | | | | | | |
| 28 | | | | | | |
| 29 | | | | | | |
| 30 | | | | LangSub | 593.41 | 1526.41 |
| TOT | 25 | 14,933 | 4,378,582 | | | |

CONTINUED FROM FIG. 3A ①

| if CodeGen add 400% | ifSun Threads add 20% | ifKernal& P2V add 400% | if MultiNat add10% | if IPC add 10% | embSQL add10% | if cluster add15% | if compute-intensive add 10% |
|---|---|---|---|---|---|---|---|
| 1.77 | 1.77 | 7.08 | 7.08 | 7.08 | 7.08 | 7.08 | 7.79 |
| 1035.10 | 1035.10 | 4140.40 | 4140.40 | 4554.44 | 4554.44 | 4554.44 | 4554.44 |
| 57.36 | 57.36 | 57.36 | 57.36 | 57.36 | 57.36 | 57.36 | 57.36 |
| 35.44 | 35.44 | 141.76 | 141.76 | 141.76 | 155.94 | 155.94 | 155.94 |
| 0.09 | 0.09 | 0.09 | 0.09 | 0.09 | 0.09 | 0.09 | 0.09 |
| 206.00 | 206.00 | 206.00 | 206.00 | 206.00 | 206.00 | 206.00 | 206.00 |
| 3.73 | 3.73 | 3.73 | 3.73 | 3.73 | 3.73 | 3.73 | 4.10 |
| 0.10 | 0.10 | 0.40 | 0.40 | 0.40 | 0.40 | 0.40 | 0.40 |
| 2.52 | 2.52 | 2.52 | 2.52 | 2.52 | 2.52 | 2.52 | 2.52 |
| 0.26 | 0.26 | 0.26 | 0.26 | 0.26 | 0.26 | 0.26 | 0.26 |
| 0.10 | 0.10 | 0.40 | 0.40 | 0.40 | 0.40 | 0.40 | 0.40 |
| 0.10 | 0.10 | 0.10 | 0.10 | 0.10 | 0.10 | 0.10 | 0.10 |
| 0.01 | 0.01 | 0.01 | 0.01 | 0.01 | 0.01 | 0.01 | 0.01 |
| 4.20 | 4.20 | 4.20 | 4.62 | 4.62 | 4.62 | 4.62 | 4.62 |
| 7.00 | 7.00 | 7.00 | 7.00 | 7.00 | 7.00 | 7.00 | 7.00 |
| 73.53 | 73.53 | 73.53 | 73.53 | 73.53 | 73.53 | 73.53 | 73.53 |
| 0.09 | 0.09 | 0.09 | 0.09 | 0.09 | 0.09 | 0.09 | 0.09 |
| 1.32 | 1.32 | 1.32 | 1.32 | 1.32 | 1.32 | 1.32 | 1.32 |
| 0.17 | 0.17 | 0.17 | 0.17 | 0.17 | 0.17 | 0.17 | 0.19 |
| 22.73 | 22.73 | 22.73 | 22.73 | 22.73 | 25.00 | 28.75 | 28.75 |
| 0.44 | 0.44 | 0.44 | 0.44 | 0.44 | 0.44 | 0.44 | 0.44 |
| 4.01 | 4.01 | 4.01 | 4.01 | 4.01 | 4.01 | 4.01 | 4.01 |
| 0.00 | 0.00 | 0.00 | 0.00 | 0.00 | 0.00 | 0.00 | 0.00 |
| 1.01 | 1.01 | 1.01 | 1.01 | 1.01 | 1.01 | 1.01 | 1.01 |
| 182.05 | 182.05 | 728.20 | 728.20 | 801.02 | 801.02 | 801.02 | 801.02 |
| 1639.13 | 1639.13 | 5402.81 | 5403.23 | 5890.09 | 5906.54 | 5910.29 | 5911.39 |

FIG. 5 ically, the present invention relates to a calculation tool that computes migration points for migrating applications/software between platforms.

CALCULATING MIGRATION POINTS FOR APPLICATION MIGRATION

TECHNICAL FIELD

In general, the present invention relates to migration point counting. Specifically, the present invention relates to a calculation tool that computes migration points for migrating applications/software between platforms.

BACKGROUND

Business and technology drivers have created an environment where enterprises need, or have an incentive, to migrate legacy applications onto a new platform. Older platforms become outdated or unsupported, which creates increased risk for extended outages due to software and/or hardware maintenance and/or repair. Business drivers also include an opportunity to reduce execution time to meet critical processing windows, reduce power and space usage, and/or to move workloads to a different computing model such as a cloud computing model among other motivators. Currently, there are challenges in accurately measuring information technology (IT) migration projects and/or the ability to express such measurements quantitatively.

SUMMARY

Embodiments of the present invention relate to "migration points" and an associated method and calculation tool. In general, a migration point is a number that represents an evaluation of the size and complexity of performing a migration, port, or refresh of an application from a legacy platform to a new target platform. When migration points are applied to applications across a portfolio, the migration points provide a relative measurement of the size and complexity necessary to perform the migration. Additionally, this measurement can be used to make a determination in calculating migration productivity (i.e., migration points divided by person-months, similar to how software productivity utilizes function points). In a typical embodiment, the migration point total is based on a set of qualitative migration points and a set of quantitative migration points, which are based on various technical aspects of the application, operating system, and hardware involved with the migration process.

A first aspect of the present invention provides a computer-implemented method for calculating migration points for migrating an application in an information technology (IT) environment, comprising: at least one computer calculating a set of qualitative data migration points for the application, the set of qualitative migration data points being a function of at least one of the following: operating system migration points, code migration points, database migration points, software migration points, or middleware migration points; the at least one computer calculating a set of quantitative data migration points for the application, the set of quantitative migration data points being a function of at least one of the following: production points, code synchronization points, testing and system interface points, or subject matter expert (SME) points; and the at least one computer calculating the migration points based on the set of qualitative migration points and the set of quantitative migration points.

A second aspect of the present invention provides a system for calculating migration points for migrating an application in an information technology (IT) environment, comprising: a bus; a processor coupled to the bus; and a memory medium coupled to the bus, the memory medium comprising instructions to: calculate a set of qualitative data migration points for the application, the set of qualitative migration data points being a function of at least one of the following: operating system migration points, code migration points, database migration points, software migration points, or middleware migration points; calculate a set of quantitative data migration points for the application, the set of quantitative migration data points being a function of at least one of the following: production points, code synchronization points, testing and system interface points, or subject matter expert (SME) points; and calculate the migration points based on the set of qualitative migration points and the set of quantitative migration points.

A third aspect of the present invention provides a computer program product for calculating migration points for migrating an application in an information technology (IT) environment, the computer program product comprising a computer readable storage media, and program instructions stored on the computer readable storage media, to: calculate a set of qualitative data migration points for the application, the set of qualitative migration data points being a function of at least one of the following: operating system migration points, code migration points, database migration points, software migration points, or middleware migration points; calculate a set of quantitative data migration points for the application, the set of quantitative migration data points being a function of at least one of the following: production points, code synchronization points, testing and system interface points, or subject matter expert (SME) points; and calculate the migration points based on the set of qualitative migration points and the set of quantitative migration points.

A fourth aspect of the present invention provides a method for deploying a system for calculating migration points for migrating an application in an information technology (IT) environment, comprising: deploying a computer infrastructure being operable to: calculate a set of qualitative data migration points for the application, the set of qualitative migration data points being a function of at least one of the following: operating system migration points, code migration points, database migration points, software migration points, or middleware migration points; calculate a set of quantitative data migration points for the application, the set of quantitative migration data points being a function of at least one of the following: production points, code synchronization points, testing and system interface points, or subject matter expert (SME) points; and calculate the migration points based on the set of qualitative migration points and the set of quantitative migration points.

BRIEF DESCRIPTION OF THE DRAWINGS

These and other features of this invention will be more readily understood from the following detailed description of the various aspects of the invention taken in conjunction with the accompanying drawings in which:

FIGS. 2A-C depicts a spreadsheet produced by the migration point counting model according to an embodiment of the present invention.

FIGS. 3A-B depicts a spreadsheet showing a migration point language calculation according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention relate to "migration points" and an associated method and calculation tool. In general, a migration point is a number that represents an evaluation of the size and complexity of performing a migration, port, or refresh of an application from a legacy platform to a new target platform. When migration points are applied to applications across a portfolio, the migration points provide a relative measurement of the size and complexity necessary to perform the migration. Additionally, this measurement can be used to make a determination in calculating migration productivity (i.e., migration points divided by person-months, similar to how software productivity utilizes function points). In a typical embodiment, the migration point total is based on a set of qualitative migration points and a set of quantitative migration points, which are based on various technical aspects of the application, operating system, and hardware involved with the migration process.

Figure 1:
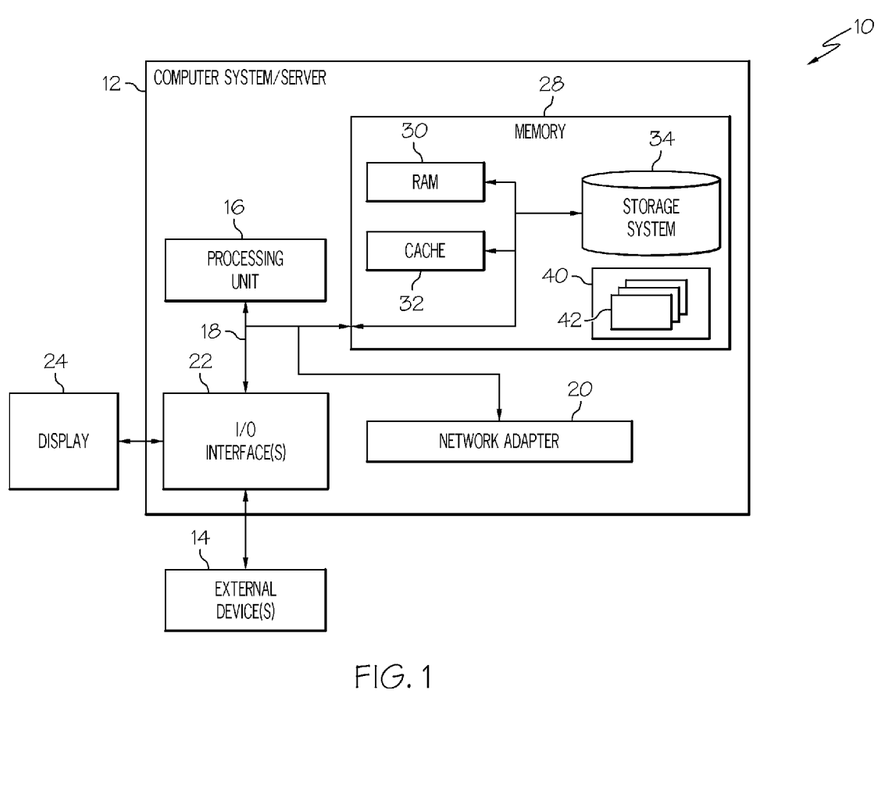
FIG. 1 depicts a computing node according to an embodiment of the present invention.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multi-processor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Migration point program/utility 40, having a set (at least one) of program modules 42, may be stored in memory 28 by way of example, and not limitation, as well as an operating system, one or more application programs, other program modules, and program data. In general, migration point program 40 performs the function of the present invention as described herein. For example, migration point program 40 will compute a migration point total indicating a complexity of a proposed application migration, and provide various outputs (e.g., spreadsheets, charts, etc.) Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is understood that this invention can be practiced in any type of computing environment, an example of which is a cloud computing environment. In any event, as indicated above, embodiments of the present invention provide an approach for computing a migration point total for migrating an application from one system/platform to another. In general, the following technical attributes are captured and evaluated:

(a) Source and target operating systems (OS) manufacturers and versions (b) Number of OS generations behind the current level on which the application resides (c) Dates of last full application build (d) Number of production releases since last full application build (e) Assessment of whether application code could be "frozen" during migration (f) Time (e.g., years) since last technical refresh of all or parts of the application (g) Database manufacturer, version and size and generations behind current (h) Number of system interfaces (i) Number of servers required by application (j) Number of commercial off-the-shelf (COTS) packages and how many of those need to be replaced versus upgraded (k) Number of middleware packages and how many of those need to be replaced versus upgraded (l) Number of person-hours to execute one pass of a full regression test of the application (m) Number of production releases in the last 12 months (n) Number of available application subject matter experts for consultation (o) List of languages used and attributes per language as follows:
   i) name
   ii) construct
   iii) version
   iv) number of files
   v) lines of code
   vi) custom code generator usage
   vii) Portable User Interface for Unix (POSIX) thread usage
   viii) Sun thread usage
   ix) custom kernal routine usage
   x) multinational character set usage
   xi) inter-process communication usage
   xii) embedded Structured Query Language Relational Database Management System (SQL/RDBMS) usage
   xiii) application-level clustering usage
   xiv) whether this piece is "compute-intensive" or "I/O-intensive"

Illustrative Equation

The following describes the migration points calculation steps as may be performed by modules 42 of migration program 40:

(1) Calculate quantitative data migration points
   a. Calculate operating system migration points
      i. Multiply the number of source servers currently hosting the application by the number of OS generations back-versioned+1
      ii. If crossing OS Vendors, 1.a.ii=1.a.i*1.15 (15% increase), else equals 1.a.ii=1.a.i
      iii. If migration project includes a physical to virtual (P2V) migration, increase by 20%, i.e., 1.a.iii=1.a.ii*1.2
   b. Calculate Code migration points
      i. For each application development language and version
         1. Set the complexity multiplier (CM) by looking up the language and type in the languages table. Languages that are moderately portable should have a CM around 1.0. Languages that are less portable should have a CM between 1.0 and 1.99. Languages that are more portable should have a CM between 1.0 and 0.01
         2. Divide the lines of code (LOC) count by 10,000
         3. If code is generated by a code generation tool, increase 1.b.i.2 by 200%
         4. If POSIX threads are used, add 10% to 1.b.i.3
         5. If Sun OS threads are used, add 20% to 1.b.i.4 9Sun is a trademark registered by Sun Microsystems, Inc. and is currently owned by Oracle America, Inc. in the United States and/or other countries)
         6. If custom kernel routines are used and the answer to the P2V question is "yes", then add 400% to 1.b.i.5 as this part of the application will have to be reengineered.
         7. If multinational character sets are used, add 10% to 1.b.i.6

8. If inter-process communication is used, add 10% to 1.b.i.7
9. If there is embedded SQL, add 10% to 1.b.i.8
10. If app-level clustering is employed, add 15% to 1.b.i.9
11. If compute-intensive, add 10% to 1.b.i.10
c. Calculate database migration points
 i. Divide the number of gigabytes to be migrated by 100
 ii. If crossing OS vendors, increase 1.c.i by 25%
 iii. If crossing vendor databases (e.g., Oracle to DB2 or Sybase to Oracle), increase 1.c.ii by 25%
  iv. Look up the Database product and version in the table to apply the appropriated complexity factor.
d. Calculate commercial off the shelf (COTS) migration points (also referred to as software migration points)
 i. Calculate COTS and middleware complexity factors: lookup in the COTS table to apply the appropriate factor, or if uncommon and if cross OS vendor migration, 1.d.i equals 0.03+(number of OS generations back-versioned/100)
 ii. COTS migration points equals COTS complexity factor (1.d.i) code migration points (Σ1.b.i)*Total COTS packages+COTS packages to be replaced*COTS complexity factor*2*Code migration points
e. Calculate middleware migration points
 i. Middleware migration points equals MW complexity factor (1.d.i)*Code migration points (Σ1.b.i)*Total MW products+MW products to be replaced*MW complexity factor*2*code migration points
(2) Calculate qualitative data migration points
 a. Calculate the last full build & production releases per unit of time (e.g., year) points (also referred to as production points) by multiplying the number of production releases since the last full build by 0.005 then by code migration points. Factor in the number of production releases in the last 12 months, as more releases usually translates into more subject matter expert (SME) knowledge, better software configuration management (SCM) processes, and tools. If the number of production releases in the last 12 months is zero, add 10% of the quantitative data migration points. If the number of production releases in the last 12 months is 1-3, add 6% of the quantitative data migration points. If the number of production releases in the last 12 months is 4-8, add 2% of the quantitative data migration points. If the number of production releases in the last 12 months is more than 8, do not add any additional points.
 b. Calculate the code synchronization points. If the answer to the question "Can code be frozen during migration?" is "No", then this equals 5% of the code migration points.
 c. Calculate the testing & system interface points. Multiply the hours to regression test by 40% to convert to points and to include break-fix and re-test work. Add to this product the number of system interfaces multiplied by 2.
 d. Calculate the SME availability points. As the number of available SMEs increases, the amount of computer or digital forensics to discover and analyze scope decreases. Likewise, the inverse is true. Based on the contents in the "number of available application development SMEs:" field, the following will apply:
  i. If 0 available SMEs, SME availability points equals quantitative data migration points multiplied by 15%;
  ii. If 1 Available SME, SME availability points equals quantitative data migration points multiplied by 7½%;
  iii. If 2-4 Available SMEs, SME availability points equals quantitative data migration points multiplied by 3%;
  iv. If there are more than 4 Available SMEs, SME availability points equals zero.

(3) Total migration points equals quantitative data migration points plus qualitative data migration points.

Figure 2B:
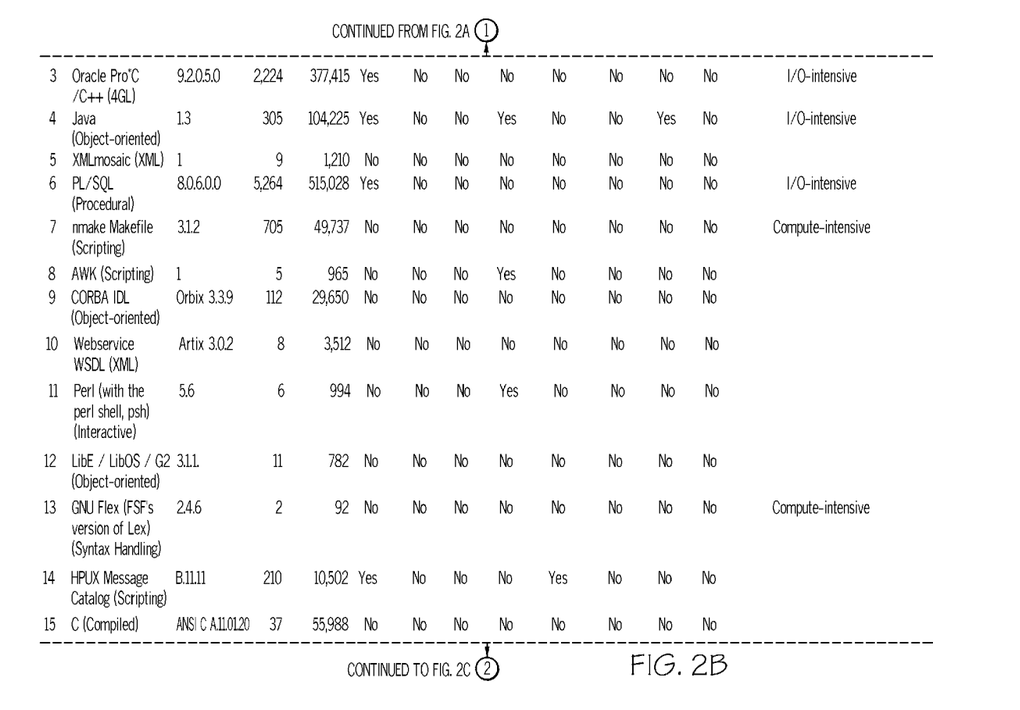
Figure 2C:
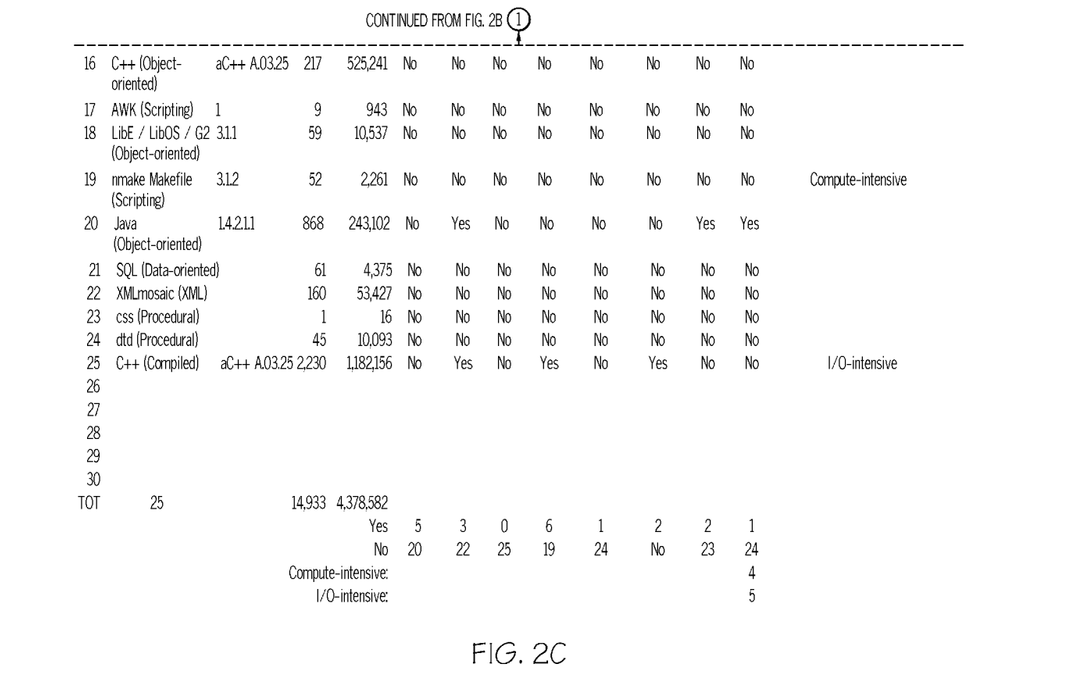

The above calculation is shown in greater detail in FIGS. 2A-C. As shown a spreadsheet 44 can be provided by migration point total 46. As indicated by the above equation, migration point total 46 is a summation of qualitative migration points and quantitative migration points shown in migration point subtotal area 48. As can be seen in FIGS. 2A-C, the various factors discussed above are all part of migration point total 42.

Figure 3B:
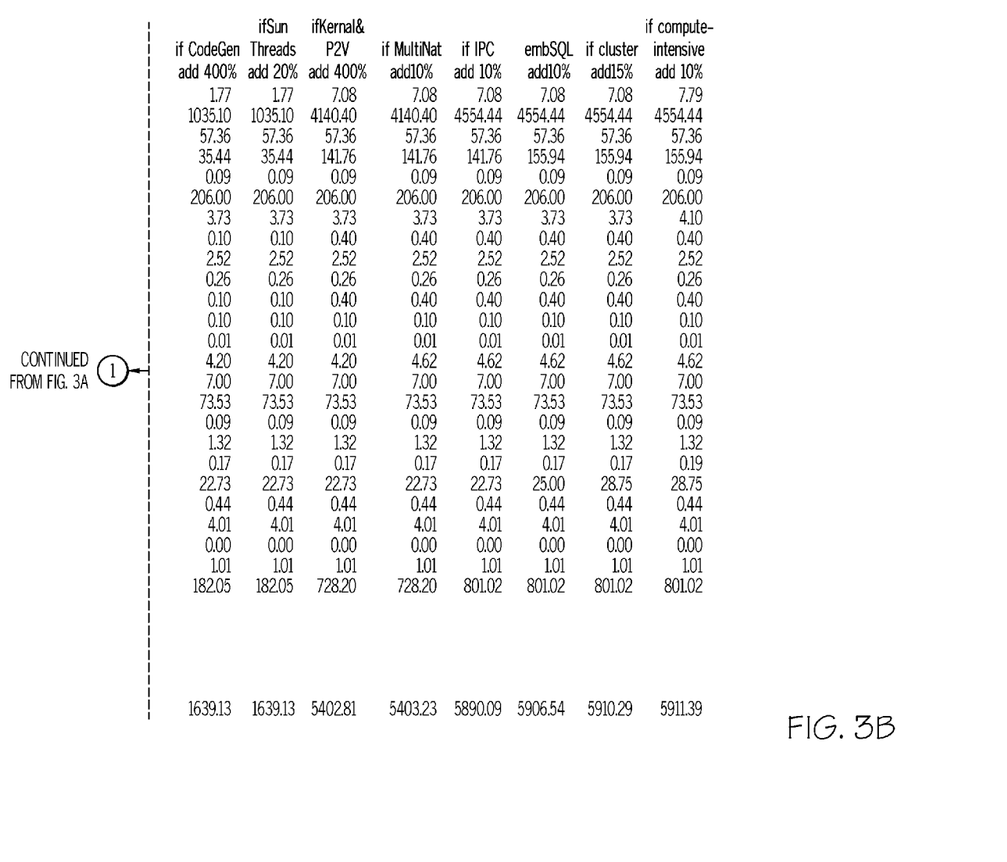
Figure 4A:
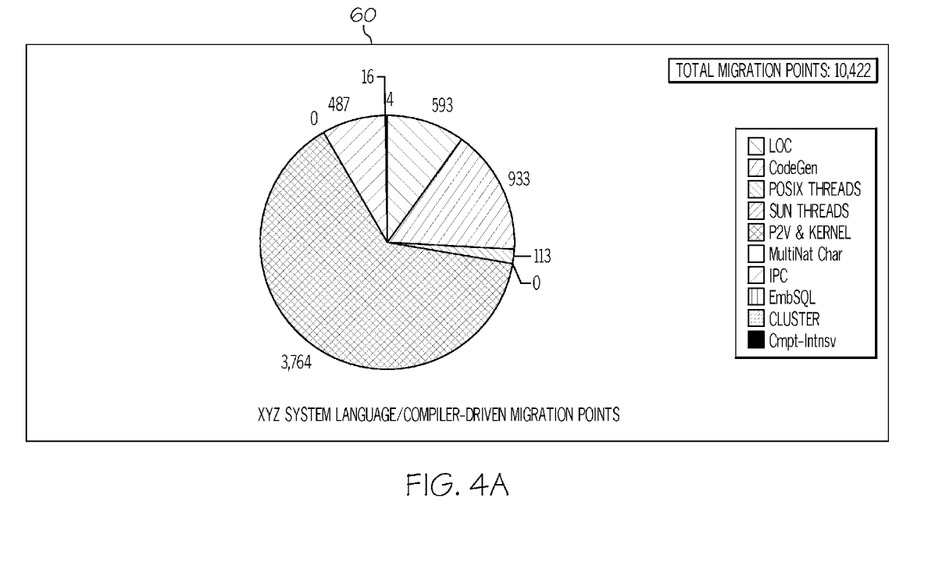
FIGS. 4A-B depicts illustrative pie charts produced by the migration point counting model according to an embodiment of the present invention.
Figure 4B:
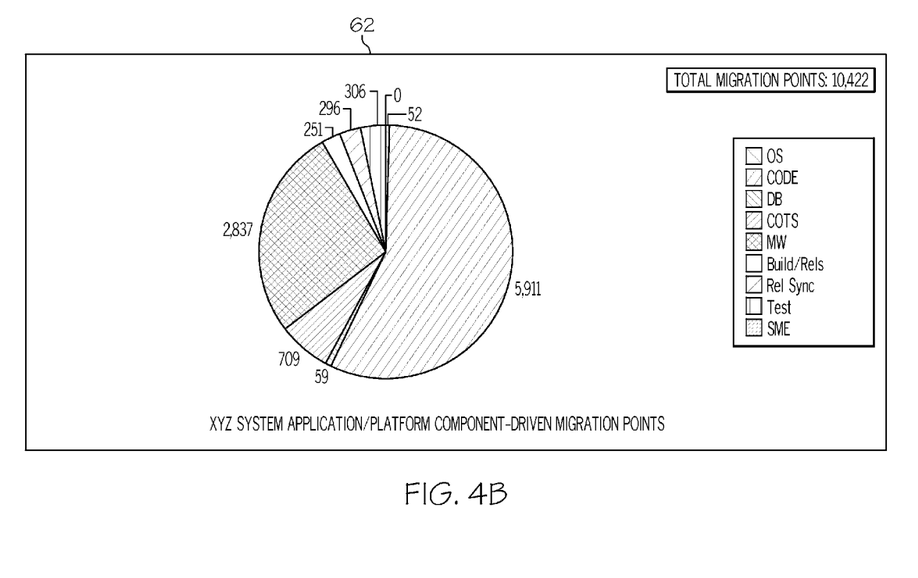

Referring now to FIGS. 3A-B, a spreadsheet 50 showing the above-discussed migration point language calculation is depicted. Specifically, FIGS. 3A-B show the evaluation of each language and language attribute, including a lookup into a table that provides a weighting in accordance to the portability of each language, multiplied by the size as measured by lines of code. In general, different languages have different levels of complexity. Accordingly, various aspects about the code being migrated will affect the migration point total. Thus, FIGS. 3A-B show a sample chart that can be produced by migration program 40 so that this data can be visually observed. FIGS. 4A-B show yet another visual output that can be produced hereunder. Specifically, FIGS. 4A-B show charts 60 and 62 depicting the migration points components that are driving the overall migration point total for the application migration.

Figure 5:
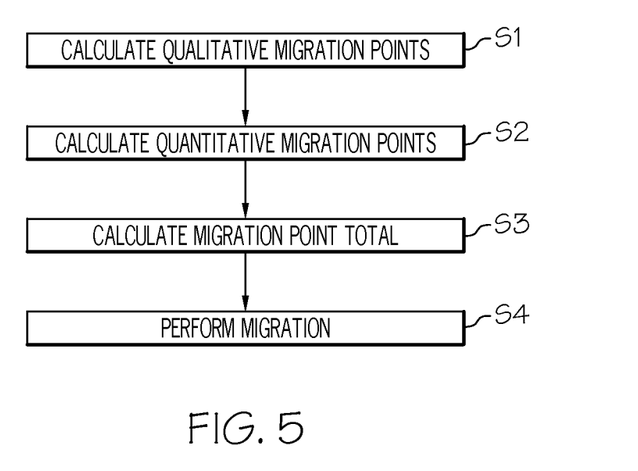
FIG. 5 depicts a method flow diagram according to the present invention.

Referring now to FIG. 5, a method flow diagram according to the present invention is shown. In step S1, a set of qualitative data migration points for the application is calculated. As indicated above, the set of qualitative migration data points is a function of at least one of the following: operating system migration points, code migration points, database migration points, software migration points, or middleware migration points. In step S2, a set of quantitative data migration points is calculated for the application. The set of quantitative migration data points is a function of at least one of the following: production points, code synchronization points, testing and system interface points, or subject matter expert (SME) points. In step S3, the migration points total is calculated based on the set of qualitative migration points and the set of quantitative migration points (e.g., by summing the two). In step S4, the migration can be completed While shown and described herein as a migration point calculation solution for application migration, it is understood that the invention further provides various alternative embodiments. For example, in one embodiment, the invention provides a computer-readable/useable medium that includes computer program code to enable a computer infrastructure to provide migration point calculation for application migration functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide a migration point calculation for application migration functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for a migration point calculation for application migration. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for calculating migration points total for migrating an application in an information technology (IT) environment, comprising:
   at least one computer calculating a set of qualitative data migration points for the application, the set of qualitative data migration points being a function of at least one of the following: operating system migration points, code migration points, database migration points, software migration points, or middleware migration points;
   the at least one computer calculating a set of quantitative data migration points for the application, the set of quantitative data migration points being a function of at least one of the following: production points, code synchronization points, testing and system interface points, or subject matter expert (SME) points;
   the at least one computer calculating the migration points total based on the set of qualitative data migration points and the set of quantitative data migration points, the migration points total indicating a complexity of migrating the application from a first system to a second system; and
   the at least one computer performing the migration of the application based on the migration points total.

2. The computer-implemented method of claim 1, the operating system migration points being based on:
   a quantity of servers currently hosting the application;
   whether the quantity of servers involves multiple software vendors; and
   whether the migration of the application involves physical to virtual migration.

3. The computer-implemented method of claim 1, the code migration points being based on a complexity multiplier and a number of lines of code in the application.

4. The computer-implemented method of claim 1, the database migration points being based on:
   a quantity of data to be migrated;
   whether the migration of the application involves multiple database vendors;
   whether the migration of the application involves multiple types of database; and
   a complexity factor that is based on a database product identity and version.

5. The computer-implemented method of claim 1, the software migration points and the middleware migration points being based on software and middleware complexity factors.

6. The computer-implemented method of claim 1, the production points being based on a last full build and production releases per year of the application.

7. The computer-implemented method of claim 1, the code synchronization points being based on a percentage of the code migration points.

8. The computer-implemented method of claim 1, the testing and system interface points being based on a percentage of a regression test performed with respect to the application.

9. The computer-implemented method of claim 1, the SME points being based on a quantity of SMEs involved with the migration of the application.

10. A system for calculating migration points total for migrating an application in an information technology (IT) environment, comprising:
    a bus;
    a processor coupled to the bus; and
    a memory coupled to the bus, the memory storing instructions to:
    calculate a set of qualitative data migration points for the application, the set of qualitative data migration points being a function of at least one of the following: operating system migration points, code migration points, database migration points, software migration points, or middleware migration points;

calculate a set of quantitative data migration points for the application, the set of quantitative data migration points being a function of at least one of the following: production points, code synchronization points, testing and system interface points, or subject matter expert (SME) points;

calculate the migration points total based on the set of qualitative data migration points and the set of quantitative data migration points, the migration points total indicating a complexity of migrating the application from a first system to a second system; and perform the migration of the application based on the migration points total.

11. The system of claim 10, wherein:
the operating system migration points being based on:
a quantity of servers currently hosting the application, whether the quantity of servers involves multiple software vendors, and whether the migration of the application involves physical to virtual migration;
the code migration points being based on a complexity multiplier and a number of lines of code in the application;
the database migration points being based on:
a quantity of data to be migrated, whether the migration of the application involves multiple database vendors, whether the migration of the application involves multiple types of database, and a complexity factor that is based on a database product identity and version; and
the software migration points and the middleware migration points being based on software and middleware complexity factors.

12. The system of claim 10, wherein:
the production points being based on a last full build and production releases per year of the application;
the code synchronization points being based on a percentage of the code migration points;
the testing and system interface points being based on a percentage of a regression test performed with respect to the application; and
the SME points being based on a quantity of SMEs involved with the migration of the application.

13. The system of claim 10, the migration points being a summation of the set of qualitative data migration points and the set of quantitative data migration points.

14. A computer program product for calculating migration points total for migrating an application in an information technology (IT) environment, the computer program product comprising a computer readable storage medium that does not consist of transitory, propagating signals, and program instructions stored on the computer readable storage medium, when executed by a processor of at least one computer, to:

calculate a set of qualitative data migration points for the application, the set of qualitative data migration points being a function of at least one of the following: operating system migration points, code migration points, database migration points, software migration points, or middleware migration points;

calculate a set of quantitative data migration points for the application, the set of quantitative data migration points being a function of at least one of the following: production points, code synchronization points, testing and system interface points, or subject matter expert (SME) points;

calculate the migration points total based on the set of qualitative data migration points and the set of quantitative data migration points, the migration points total indicating a complexity of migrating the application from a first system to a second system; and perform the migration of the application based on the migration points total.

15. The computer program product of claim 14, wherein:
the operating system migration points being based on:
a quantity of servers currently hosting the application, whether the quantity of servers involves multiple software vendors, and whether the migration of the application involves physical to virtual migration;
the code migration points being based on a complexity multiplier and a number of lines of code in the application;
the database migration points being based on:
a quantity of data to be migrated, whether the migration of the application involves multiple database vendors, whether the migration of the application involves multiple types of database, and a complexity factor that is based on a database product identity and version; and
the software migration points and the middleware migration points being based on software and middleware complexity factors.

16. The computer program product of claim 14, wherein:
the production points being based on a last full build and production releases per year of the application;
the code synchronization points being based on a percentage of the code migration points;
the testing and system interface points being based on a percentage of a regression test performed with respect to the application; and
the SME points being based on a quantity of SMEs involved with the migration of the application.

17. The computer program product of claim 14, the migration points being a summation of the set of qualitative data migration points and the set of quantitative data migration points.

18. A method for deploying a system for calculating migration points total for migrating an application in an information technology (IT) environment, comprising:
deploying a computer infrastructure being operable to:
calculate a set of qualitative data migration points for the application, the set of qualitative data migration points being a function of at least one of the following: operating system migration points, code migration points, database migration points, software migration points, or middleware migration points;
calculate a set of quantitative data migration points for the application, the set of quantitative data migration points being a function of at least one of the following: production points, code synchronization points, testing and system interface points, or subject matter expert (SME) points;
calculate the migration points total based on the set of qualitative data migration points and the set of quantitative data migration points, the migration points total indicating a complexity of migrating the application from a first system to a second system; and
perform the migration of the application based on the migration points total.

* * * * *